UNITED STATES PATENT OFFICE.

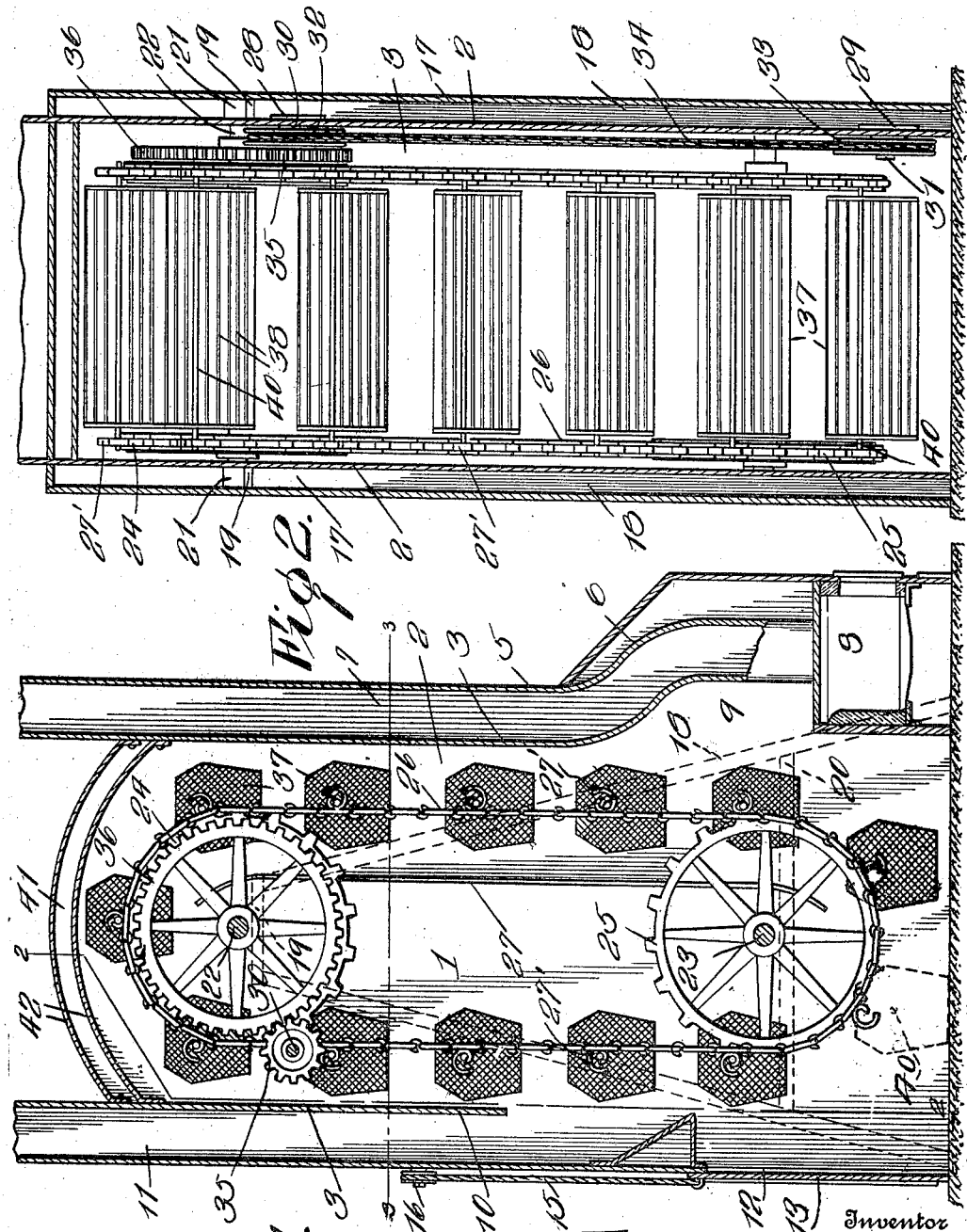

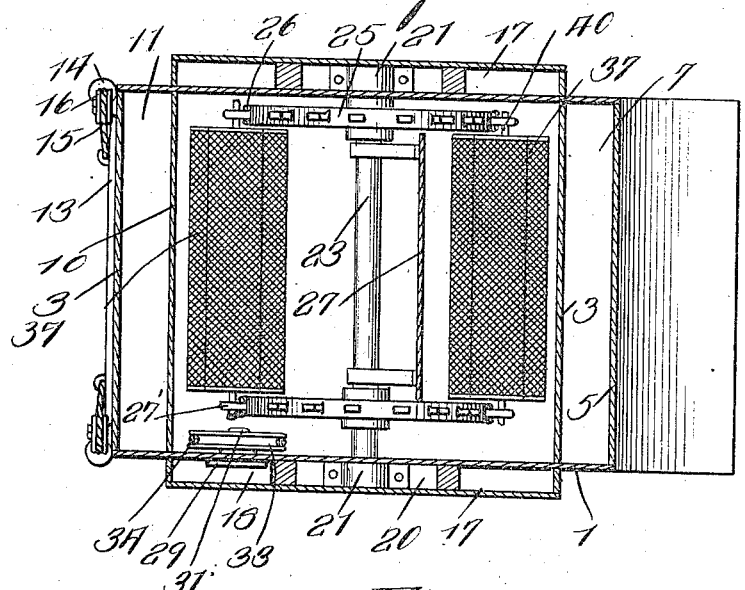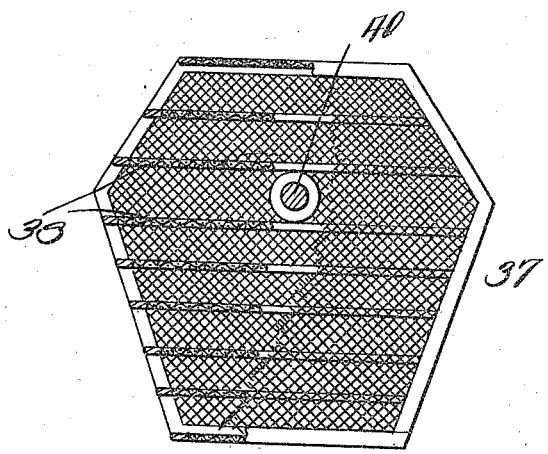

EDWIN T. ROBERTS, OF ROSWELL, NEW MEXICO.

FRUIT-DRIER.

1,093,011.

Specification of Letters Patent.  Patented Apr. 14, 1914.

Application filed April 4, 1912. Serial No. 688,348.

*To all whom it may concern:*

Be it known that I, EDWIN T. ROBERTS, a citizen of the United States, residing at Roswell, in the county of Chaves and State of New Mexico, have invented certain new and useful Improvements in Fruit-Driers, of which the following is a specification.

This invention is directed to improvements in an apparatus for drying fruit, and has for its object to produce an apparatus of this character wherein the fruit to be dried is subjected to artificial heat.

With these and other objects in view, the invention consists in certain novel features of construction, combination and arrangement of parts as will be hereinafter fully described and claimed.

In the drawings: Figure 1 is a vertical sectional view of the apparatus. Fig. 2 is a sectional view on line 2—2 of Fig. 1. Fig. 3 is a similar view on line 3—3 of Fig. 1. Fig. 4 is a detail view, partly in section, of one of the drying baskets.

The apparatus comprises a drying chamber 1, the same being preferably rectangular in cross section and is inclosed by spaced side walls 2, thus producing a dead air space to more effectually retain the heat in the chamber 1. Connected in any suitable manner to the side walls are end walls 3, one of which serves for closing the rear of the chamber 1, while the other partially closes the front of said chamber. Secured to the front wall 3 is a plate 5, having the downwardly extending flanges 6, and when the plate 5 is in its proper position, a smoke stack 7 is produced for conducting the products of combustion from the fire box of the furnace 8, which is located below the front wall 3. Heat from the furnace 8 is conducted to the chamber 1 through a passage-way 9. A plate 10, the same being formed in a manner similar to the plate 5, is connected to the rear wall 3, and produces a flue 11, the purpose of which will appear later. Access to the interior of the chamber 1 is had through a door-way 12, said door-way being formed in the lower ends of the rear wall 3 and plate 10, the same being closed by a sliding door 13, said door being counter-balanced by weights 14 which are attached to cords 15. The cords 15 pass over pulleys 16 which are suitably mounted upon the outer wall of the flue 11, said cords being secured to the upper edge of the door 13. Mounted within the chamber 1 is a pair of spaced supports 17, the same consisting of a pair of downwardly diverging legs 18, said legs being connected at their upper ends by a brace bar 19, and intermediate their ends by a similar bar 20, both bars being provided with boxings 21 for receiving the opposite ends of upper and lower shafts 22 and 23, respectively. Mounted upon the shaft 22 is a pair of spaced sprocket wheels 24, while similar sprocket wheels 25 are mounted upon the lower shaft 23, and in direct alinement with those carried by the upper shaft 22. Passing around the sprockets 24 and 25 are sprocket chains 26, certain links of which being provided on their outer faces with hooks 27', the purpose of which will appear later. Supported by the support 17 is a baffle plate 27, which extends from the upper shaft to a short distance below the shaft 23, thus directing the heat from the furnace 8 upwardly between the front wall 3 and said baffle plate, and from thence downwardly where it enters the lower end of the flue 11. Supported by one of the rear legs 18 of the support 17 are upper and lower bearings 28 and 29, respectively, and by which are supported stub shafts 30 and 31. Rotatably mounted upon the stub shaft 30 is a groove pulley 32, while upon the stub shaft 31 is a similarly mounted groove pulley 33. Over and around the groove pulleys is passed an endless cord or cable 34, which may be grasped upon opening of the door 13 and operated to rotate the sprockets 24 and 25, and thus the sprocket chains 26. This operation is accomplished through a gear 35 which is rigidly connected to the pulley 32, and is adapted to mesh with the gear 36 formed with the upper sprocket wheel 24.

The baskets for receiving the fruit to be dried are formed from wire mesh, and are designated by the numeral 37. Each basket is provided with a plurality of wire mesh shelves 38, which are spaced apart so that the fruit may be easily deposited thereon. The baskets 37 have openings 38' formed in their sides for placing and removing the fruit. Passing through opposite sides of the baskets 37 are shafts 40, the ends of which being adapted to detachably engage the hooks 27' carried by the links of the sprocket chains 26, thus pivotally suspending the baskets 37 between the sprocket chains 26 so that the same will, when traveling remain in their proper positions. The dome 41 for closing the top of the drying chamber 1 consists of a pair of spaced curved plates 42, which produce a dead air space for effectually retaining the heat within the said chamber.

The operation of the apparatus is as follows: The baskets 37 are filled with fruit to be dried, and one at a time are suspended upon the hooks 27' and the rope or cable 34 operated so that certain of the baskets will be moved to a position in the space between the baffle plate 27 and flue 11, where they may remain stationary to be thoroughly dried. It will be noted that the fruit baskets during the drying are gradually moved so that they are first subjected to lesser heat from the furnace, and then upon operation of the rope or cable 34, which rotates the sprocket wheels 24 and 25 the baskets are moved upwardly and over the upper shaft 22, and thence descend upon the opposite sides of the baffle plate 27, thus being subjected to the intense heat. Thus it will be seen that a basket may be removed through the door-way 12, and another one suspended in its place. Further it will be noted that the hooks 27' are so formed that the baskets 37 will be automatically released, as clearly shown in dotted lines in Fig. 1, said baskets being released at a point adjacent the door way 12 so that the same can be conveniently removed.

What is claimed is:

An apparatus of the class described comprising a drying chamber, supports mounted in the chamber, transverse shafts journaled in the supports, pairs of sprocket wheels mounted upon the shafts, sprocket chains passing over and around the sprocket wheels, certain links of the sprocket chains being formed with hooks having spaced ends, fruit containing baskets through which are passed shafts, the ends of which engage or disengage said hooks upon passage thereof between the spaced ends, and means for rotating one of the sprocket wheels to cause the sprocket chains and baskets suspended thereby to travel.

In testimony whereof I affix my signature, in the presence of two witnesses.

EDWIN T. ROBERTS.

Witnesses:
  WILLIAM R. COVERT,
  WALTER GILL.